Figure 1:
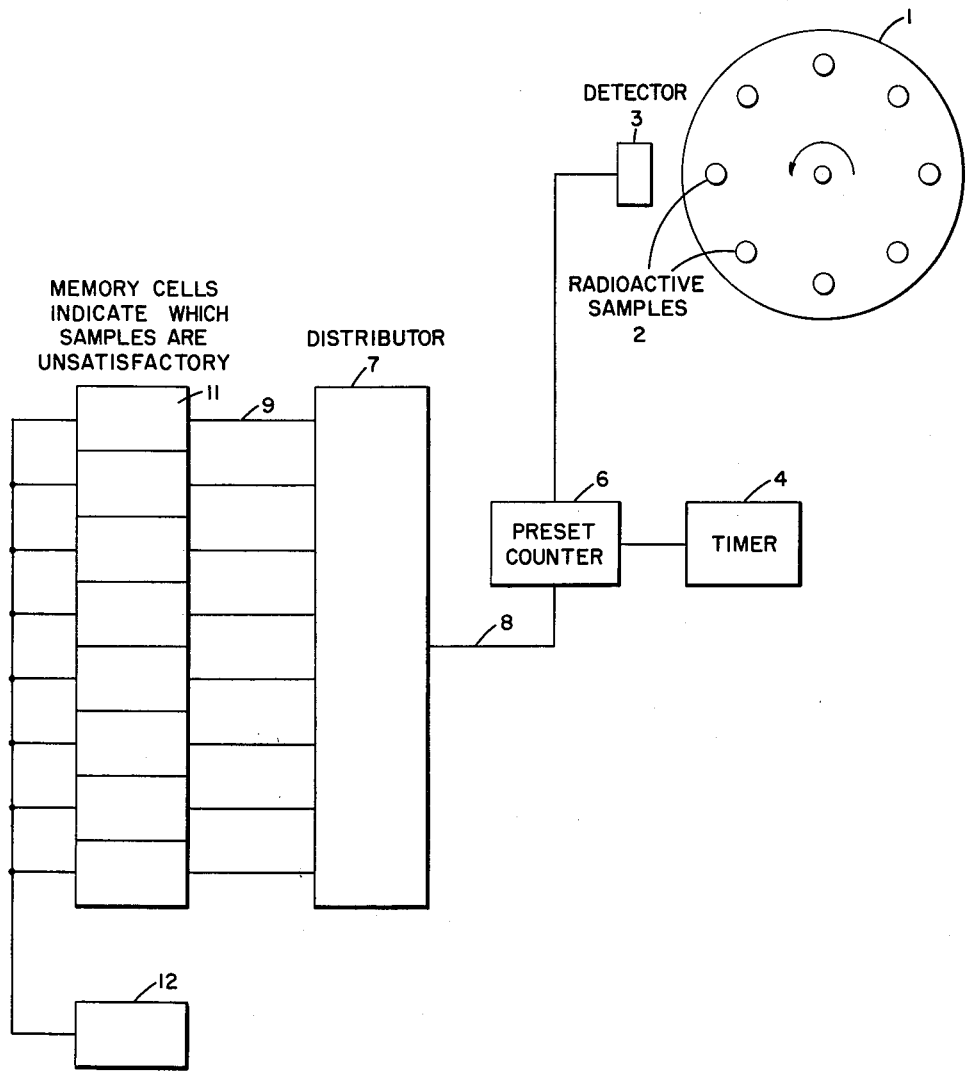

April 23, 1963     E. H. GATZERT     3,087,063
SYSTEM FOR AUTOMATICALLY INSPECTING A BATCH OF SAMPLES
Filed July 28, 1959     5 Sheets-Sheet 1

INVENTOR.
ERNEST H. GATZERT
BY F. H. Henson
ATTORNEY

United States Patent Office 3,087,063
Patented Apr. 23, 1963

3,087,063
SYSTEM FOR AUTOMATICALLY INSPECTING A BATCH OF SAMPLES
Ernest H. Gatzert, Rochester, N.Y., assignor to General Dynamics Corporation, Rochester, N.Y., a corporation of Delaware
Filed July 28, 1959, Ser. No. 830,003
11 Claims. (Cl. 250—106)

The present invention relates to systems for automatically inspecting a batch of samples to determine whether or not all of the samples are satisfactory.

In the radiation measuring field, a present method of examining the radioactive count of a number of samples to be tested involves loading the samples into a machine which sequentially feeds them to a detector whose output is connected to a scaler which in turn measures the count of each sample and actuates a printer to print the result of each measurement. After the run is completed, the technician examines the printed record to see if any of the samples have registered an unacceptable low count. If the only unacceptably low count is represented by the twentieth number printed on the sheet, he must count back to remove the twentieth sample from the otherwise satisfactory batch. Since all samples in a batch may often be satisfactory, considerable time is saved if the testing device, rather than the technician is able to determine whether or not the counts of all samples are satisfactory. It may also be desirable that the samples be reinspected over and over again until the counts of all samples are satisfactory, at which time an appropriate signal notifies the technician of this fact. This type of operation saves considerable time since otherwise the technician must check all the figures on the printed record after each run and recycle the sample feeding mechanism if any counts are unsatisfactory.

It is obvious that a device for continuously and automatically inspecting and reinspecting the samples of a batch until all samples have been deemed satisfactory and for giving a signal at this time may be readily utilized in many other fields.

Accordingly, it is the principal object of the present invention to provide a new and improved automatic sampling system.

It is a further object of the present invention to provide a sampling system which automatically inspects all of the samples in a batch successively, and continues to reinspect only those samples which have previously failed to pass inspection until all of the samples in the batch have passed inspection, at which time an indication is given of this fact, and the inspection process is terminated.

It is a further object of the present invention to provide a sampling system which automatically indicates which sample or samples, if any, have failed to pass inspection so that the sample may be easily and rapidly removed from the batch.

Further objects, features and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings of which:

FIG. 1 discloses a schematic diagram of the overall operation of the system, and FIGS. 2–5 disclose a detailed drawing of the system.

Referring now to FIG. 1, a circular table 1 is shown which is intermittently rotated by a motor (not shown). This table supports a number of radioactive samples 2 to be sequentially inspected to determine whether or not their count rate or count is satisfactory. As each sample becomes positioned opposite detector 3, the table is stopped and timer 4 is triggered at which time preset counter 6 commences to count the pulses produced by detector 3. After a fixed and predetermined time interval, the timer is deactivated and further pulses produced by detector 3 are not permitted to enter the counter. The operation of distributor 7 is synchronized with the intermittent movement of rotary table 1 so that distributor input lead 8 is coupled to input lead 9 of the first memory cell 11 when the first sample is positioned opposite detector 3, and in a similar manner the input leads of the other memory cells are coupled to distributor input lead 8 when the sample corresponding to each memory cell is positioned opposite detector 3. Assume that the first sample is positioned opposite detector 3. At that time a signal will be transmitted through distributor 7 to the input circuit of the first memory cell in the event that the count in preset counter 6 falls below the preset figure at the end of the fixed interval thereby to set the first memory cell 11 to indicate that the count of the first sample is unsatisfactory. The count of each sample is successively measured in like manner and a corresponding memory cell is set only when its associated sample fails to produce a satisfactory count. In the event that none of the memory cells have been set after the first cycle, indicator 12 is activated to notify a technician that all samples in the batch are satisfactory. If one or more of the memory cells are set, the system commences a second cycle for reinspection purposes. The motor control circuit (not shown) is coupled with and controlled by the memory cells as will be explained hereinafter, so that only those samples whose corresponding memory cells are set will be reinspected. If the first reinspection of the unsatisfactory sample results in the production of a satisfactory count, the memory cell corresponding to this sample is reset, otherwise this memory cell remains set.

The machine recycles and continues to inspect unsatisfactory samples and skip over satisfactory samples until all samples are deemed satisfactory, at which time the motor is automatically deenergized and an appropriate visual or audible signal is given. If desired, the memory cells may be adapted to give a visual indication of their state so that the operation of the system may be manually halted before all samples are deemed satisfactory and the unsatisfactory sample or samples may thus be readily identified by the visual output of those memory cells which are set. Thus, the unsatisfactory sample or samples may be rapidly identified and removed from the otherwise satisfactory batch.

Referring now to FIGS. 2–5, which are to be arranged in numerical order from left to right, rotary table 540 is disclosed coupled to a motor 541 through a shaft. One hundred radioactive samples, such as sample 543, are mounted upon the rotary table 540. Radiation detector 550 is positioned so that it is able to detect the radioactive count of the sample immediately adjacent to it and none other. Radiation detector 550 is coupled to a conventional binary counting chain or scaler 562 through a timer-gate circuit 560. The function of the timer-gate circuit is to allow pulses produced by the radiation detector 550 to be fed to the input lead 561 of binary scaler 562 during fixed and predetermined time intervals so that the count rate or count of individual samples may be measured.

Figure 4:
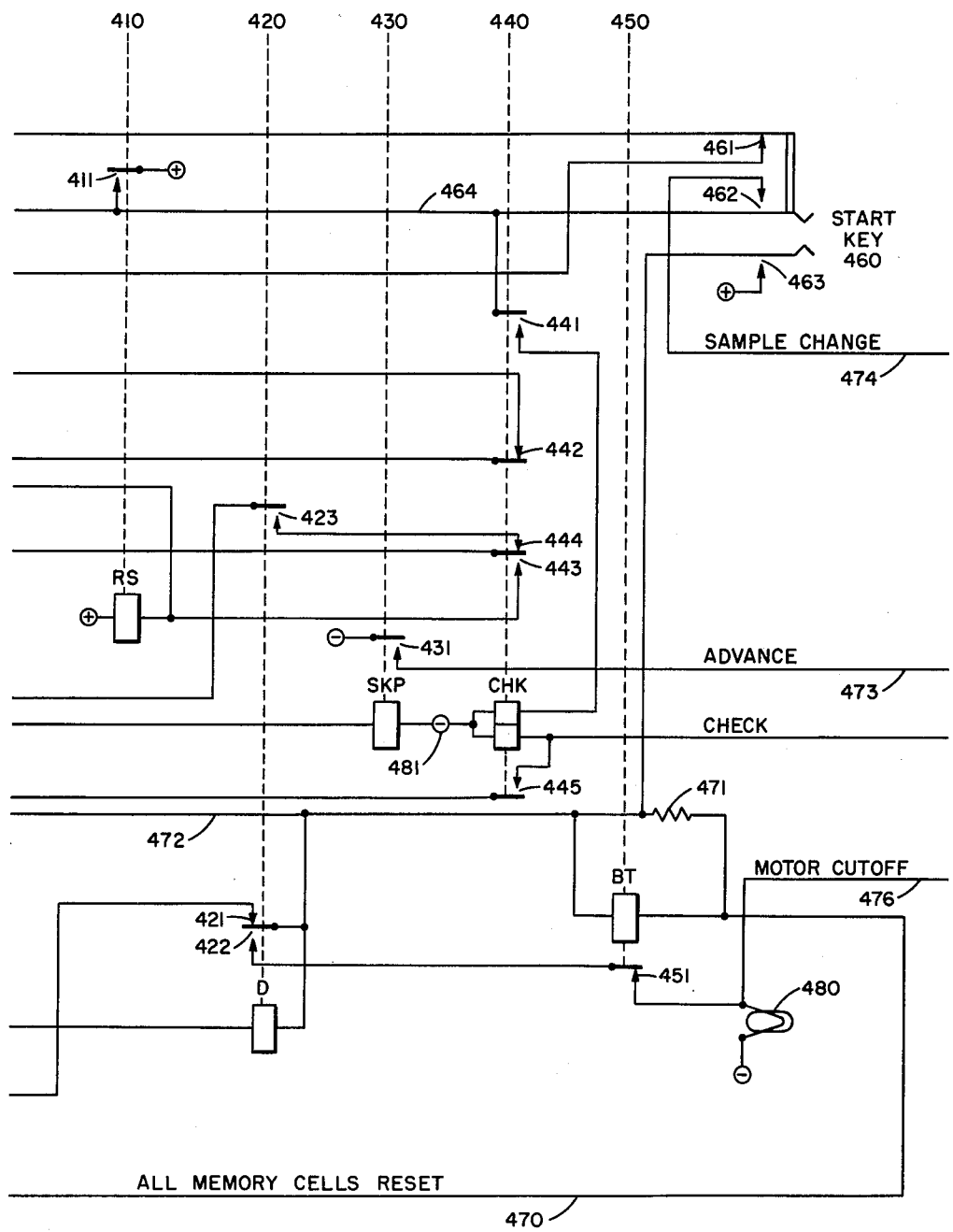
Figure 5:
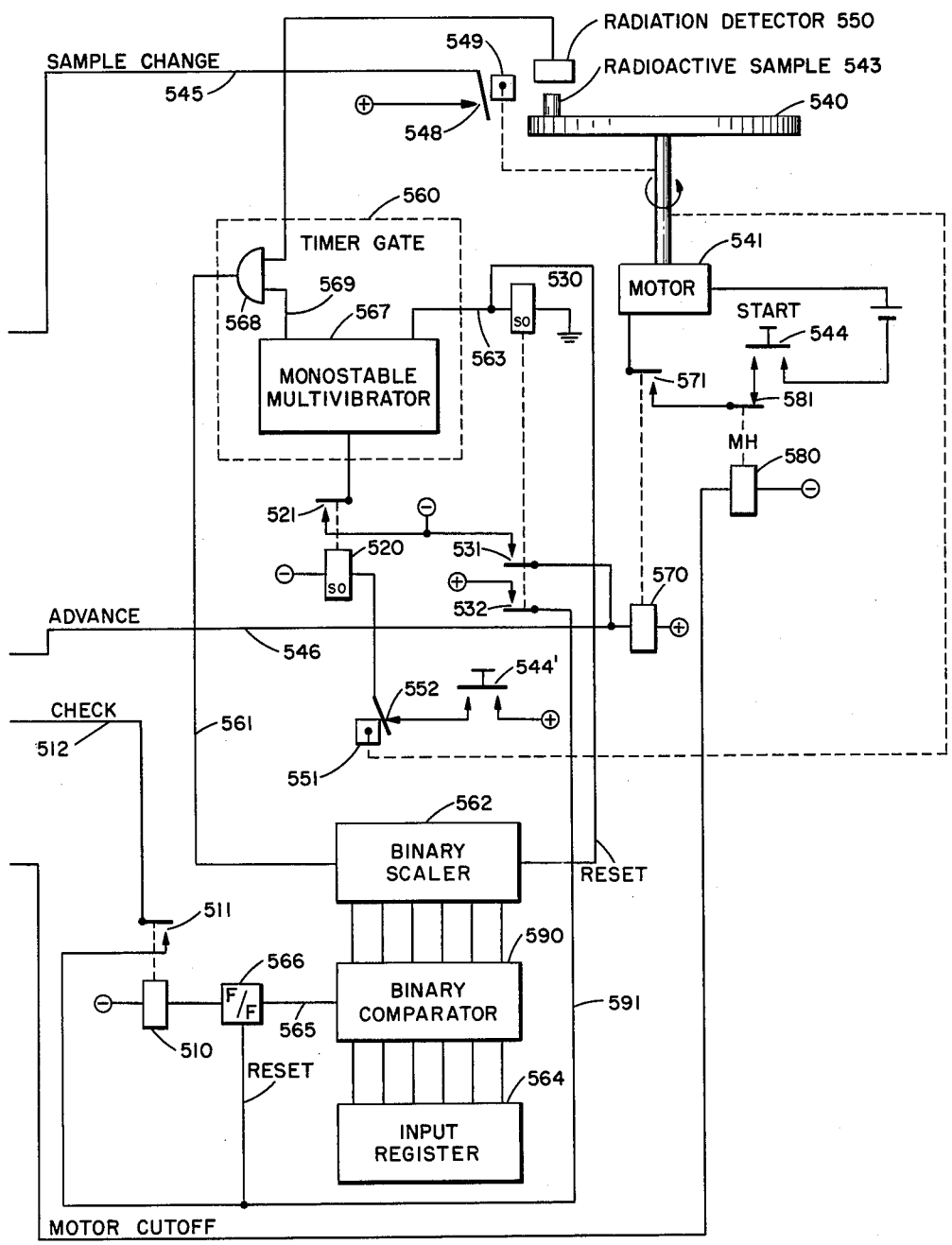

The inspection system is put into operation by actuating start key 460 disclosed in FIG. 4 thereby to close contacts 462 and 463 and to open contacts 461. Start buttons 544 and 544' are also actuated. The first radioactive sample 543 is positioned adjacent to radiation detector 550 since the system has been "homed" previously. Cams 549 and 551 which control contacts 548 and 552, respectively, are mechanically coupled to the rotary table 540 and are complementary in their action so that contacts 548 associated with cam 549 are closed when contacts 552, associated with cam 551, are open and vice versa. When the cycle is begun, contacts 552 are closed and contacts 548 are open and the first radioactive sample 543 is positioned adjacent to radiation detector 550. Relay 520 becomes energized triggering monostable multivibrator 547 into a set state, which action defines the start of the fixed measuring interval. AND gate 568 is enabled at this time so that pulses produced by radiation detector 550 are applied to input 561 of binary scaler 562 and accordingly the scaler commences to count these pulses. After a predetermined time interval, which is a function of the component values of monostable multivibrator 567, a pulse is produced by the output circuit of the multivibrator on lead 563 which resets the binary scaler 562. Shortly after the resetting of binary scaler 562, the contacts 531 and 532 of slow-to-operate relay 530 are closed for a short period thereby energizing relay 570 which in turn closes contacts 571 to cause motor 541 to rotate one one-hundredth of a revolution. As a result the second radioactive sample is brought into the inspection position adjacent to radiation detector 550. Motor 541 may be an ordinary stepping magnet utilizing a solenoid pawl and ratchet. The closing of contacts 532 resets flip-flop 566 in the event that the flip-flop was set during the previous timing interval as will be explained hereinafter. It should be understood at this point that the motor control circuit and the timer-gate disclosed in FIG. 5 are merely illustrative. Many different timer and gating devices may be utilized to define the timing interval just as various types of motor control circuits and motors may also be utilized.

The number representative of a count which is to be regarded as satisfactory for the particular time interval utilized, is fed into binary input register 564. The binary comparator 590 is of a conventional type which produces an output pulse on lead 565 if and when the binary number produced on the output leads of scaler 562 becomes equal to the binary number stored in input register 564. Since the binary scaler 562 is reset at the end of the preset time interval, it is apparent that an output pulse will be produced on lead 565 only if the count of the particular radioactive sample being examined at the time rises above the required count. Should this occur, flip-flop 566 is triggered thereby to energize relay 510 which in turn causes contacts 511 to close. At the end of the preset time interval, contacts 531 and 532 close due to the energization of relay 530 and as a result positive potential is applied to lead 591 to reset flip-flop 566 and to energize check relay 440 over check lead 512. If the flip-flop is not triggered during the timing interval, check relay 440 cannot be operated since contacts 511 remain open. After a particular sample is inspected, contacts 548 are closed when the sample is changed thereby to produce a positive voltage on sample change lead 549 which causes the distributor of FIG. 2, described hereinafter, to advance to the next level so that the appropriate memory cell is coupled to check lead 512 when its corresponding sample is moved into position adjacent to radiation detector 550.

Assuming that the first sample is found to be satisfactory and relay 510 becomes energized, check relay 440 disclosed in FIG. 4 operates at the end of the timing interval since it becomes energized through the circuit comprising contacts 532, lead 591, contacts 511, check lead 512, and the lower winding of check relay 440. This action causes contacts 442 to open and contaccts 443 to close and remain in this condition during the sample changing interval, due to the locking circuits of check relay 440. It is important that check relay 440 remains energized during the changing of the sample just tested since the memory relay associated with the sample to be next positioned must not be inadvertently set during the transition period. This is insured since check relay 440, upon operation, locks up through contacts 445 and 317. This locking circuit is broken only upon energization of drive relay 310, but by the time drive relay 310 becomes energized the upper winding of check relay 440 has become energized through contacts 441. When contacts 548 reopen, the check relay releases but at this time contacts 313 have reopened. As table 540 is rotated, contacts 548 are operated by cam 549 to cause drive relay 310 to become energized through the circuit including closed contacts 548, sample change lead 549, closed contacts 462, lead 464, lead 370, closed interrupt contacts 251 and the winding of drive relay 310.

In the event that the first sample fails to provide a satisfactory count, check relay 440 is not operated when contacts 313 are closed and the first memory relay 210 becomes energized along with reset relay 410 over the following path: the winding of reset relay 410, closed contacts 313, closed contacts 442, closed contacts 341, brush 261 of distributor 260, the first terminal of bank A of this distributor, the winding of memory relay 210 and resistor 273. This action causes contacts 211 and 212 to close and relay 210 remains energized through the locking circuit including closed contacts 211, lead 272, lead 378, lead 470, resistor 471 and closed contacts 463. Thus, as rotary table 540 rotates to position the second sample opposite radiation detector 550, the first memory relay 210 which is associated with the first sample is operated and remains operated through the aforementioned locking circuit in the event that the first sample fails to produce a satisfactory count.

In the event that the first sample produces a satisfactory count check relay 440 becomes energized as mentioned hereinbefore through closed contacts 511. The aforementioned circuit for energizing the first memory relay 210 is broken because contacts 442 are opened at the time in which contacts 313 close and hence the first memory relay is not energized or set. The temporary energization of drive relay 310, which occurs when the samples are changed, causes contacts 311 to close to energize stepping magnet 250. Drive relay 310 locks through contacts 312, 332 and 548. The stepping magnet is thereafter deenergized when contacts 548 reopen as cam 549 is further rotated to break the locking circuit of drive relay 310, which deenergization of stepping magnet 250 causes all four brushes of distributor 260 to step and contact the second terminal of each bank. If desired, a lamp or other indicator 215 may be provided for each memory relay as shown, so that if memory relay 210 becomes set, contacts 213 will be closed to thereby give a visual indication of the state of the first memory cell.

Thus, as each sample is successively rotated into position by the energization of motor 541, a memory relay associated with each sample is set if the sample is unsatisfactory and is not set if the sample is satisfactory. The appropriate memory relay is coupled to the inspection circuit of FIG. 5 through the terminals of distributor 260 since these brushes are moved by stepping magnet 250 in step with the intermittent movement of rotary table 540.

It is necessary to transfer from banks A and C to banks B and D of distributor 260 after the fiftieth sample has been inspected so that the fifty-first through one hundredth memory cells will be engaged with the fifty-first through one-hundredth samples are inspected. Contacts 270 and 271 of bank E of distributor 260 are provided in order to carry out this function. When the distributor brushes are stepped for the fifty-first time, brush 265 contacts terminal 271 and A relay 350 is energized through a circuit comprising closed contacts 316, brush 265, terminal 271, diode 373, unoperated contacts 344, the winding of A relay 350 and resistor 371. The operation of A relay 350 causes contacts 351 to close, B relay 340 is energized and A relay 350 is locked over a circuit comprising operated contacts 463, lead 472, the lower winding of B relay 340, operated contacts 351, the winding of A relay 350 and resistor 371. As a result of the energization of B relay 340, contacts 345 are closed to cause the energization of C relay 360 through the circuit comprising closed contacts 463, closed contacts 421 of D relay 420, closed contacts 345, and the winding of C relay 360. D relay 420 is not operated at this time because no difference of potential exists across its windings. The operation of B relay 340 causes contacts 346 and 347 to close and causes contacts 341 and 343 to open thereby enabling bank B and bank D which control the fifty-first through one hundredth memory cells, and disenabling bank A and bank C so that the first fifty memory relays cannot be affected while the fifty-first through one hundredth samples are inspected.

As soon as brush 265 contacts terminal 271, drive assist relay 320 is energized through diode 372 which causes contacts 321 to close thereby energizing drive relay 310 through a circuit including closed contacts 321, interrupt contacts 251 and the winding of the drive relay. This action causes contacts 311 to close thereby to energize stepping magnet 250. Very shortly thereafter contacts 311 are reopened since the operation of stepping magnet 250 opens interrupt contacts 251 to deenergize drive relay 310. The drive relay locking circuit comprising contacts 312, 332 and 548 is ineffective since contacts 548 are open at this time. The result is that brush 265 is moved one step into contact with terminal 270. The drive assist relay is again energized through an obvious circuit and the aforementioned stepping process is repeated. It should be noted that all of the brushes of the distributor take two rapid steps through levels A and B of the distributor which levels are not coupled to any memory cells. As the distributor brushes initially contact the terminals of level A, the fifty-first sample is positioned opposite radiation detector 550. Because relay 520 is slow to operate, the very rapid stepping action through levels A and B just described terminates before timer 560 is triggered and the result is that the brushes of the distributor are in the same position as they were when the first sample was being inspected, namely the "home" position shown in FIG. 2. However, due to the continuous energization of the windings of A relay 350 and B relay 340, banks B and D are enabled by virtue of closed contacts 346 and 347. The inspection process continues until the one hundredth sample has been inspected.

After the inspection of the one hundredth sample is completed, the wipers of distributor 260 are again stepped to contact the terminals of level A. The result is that the previously held A relay 350 is deenergized because positive potential is applied through closed contacts 316, wiper 265, terminal 271, diode 373, closed contacts 345 to resistor 374 to thereby cause junction 375 to become considerably more positive than before, which reduces the flow of current through the lower winding of B relay 340, closed contacts 351 and the winding of A relay 350 to an amount which is insufficient to hold the A relay operated and it releases. B relay temporarily remains operated since contacts 348 close. The time in which wiper 365 remains in contact with terminal 271 is very small and the aforementioned stepping action caused by the energization of the drive assist relay 320 causes wiper 265 to step and come in contact with terminal 270. B relay 340 then releases since the wiper no longer contacts terminal 271 and contacts 316 are opened by energization of drive relay 310. The positive voltage applied to terminal 270 by wiper 265 cannot cause reenergization of A relay 350 and B relay 340 as was done just after the fiftieth sample was inspected due to the presence of blocking diode 372. Drive assist relay 320 is again energized to cause the distributor brushes to revert to the "home" position shown in the drawing.

When the B relay 340 becomes deenergized when wiper 265 is in contact with terminal 271, D relay 420 becomes energized since positive potential is removed from junction 380 which was formerly applied thereto through closed contacts 421 and closed contacts 345 of B relay 340 and accordingly D relay draws operating current through the winding of the C relay and operated contacts 361. It is seen that the wipers of distributor 260 are now in a position to commence a second cycle since A relay 350 and B relay 340 are again deenergized, and contacts 341 and 343 are closed to thereby enable banks A and C of distributor 260 so that the first fifty memory cells are again coupled to the inspecting circuit of FIG. 5. However, unlike the first cycle of operation, D relay 420 is now energized. As a result, contacts 422 are closed thereby enabling an energizing circuit for lamp 480, and motor halting relay 580. This energizing circuit may be traced through closed contacts 463, closed contacts 422 and contacts 451 of batch test relay 450. The lamp will not light nor will motor halting relay 580 operate unless contacts 451 are closed, and these contacts will not close as long as one memory cell remains operative due to an unsatisfactory count of its associated sample. This can be readily seen by assuming that memory relay 210 is in its set or locked condition. The winding of relay 210 draws current through the locking circuit comprising resistor 273, the winding of memory relay 210, closed contacts 211, leads 272, 378 and 470, resistor 471 and closed contacts 463. The current drawn by any one locked memory relay causes a voltage drop across resistor 471 sufficient to hold batch test relay 450 in a state of operation which in turn holds contacts 451 in an open condition so that lamp 480 cannot light and motor halting relay 580 cannot operate. Accordingly, it may be seen that lamp 480 will light after the completion of the first or subsequent cycle of operation of the system only when and if no memory relay is in a set or operated condition. When contacts 451 close to light lamp 480, positive potential is produced on motor cutoff lead to energize relay 580 which opens contacts 581 thereby halting the operation of motor 541.

Figure 2:
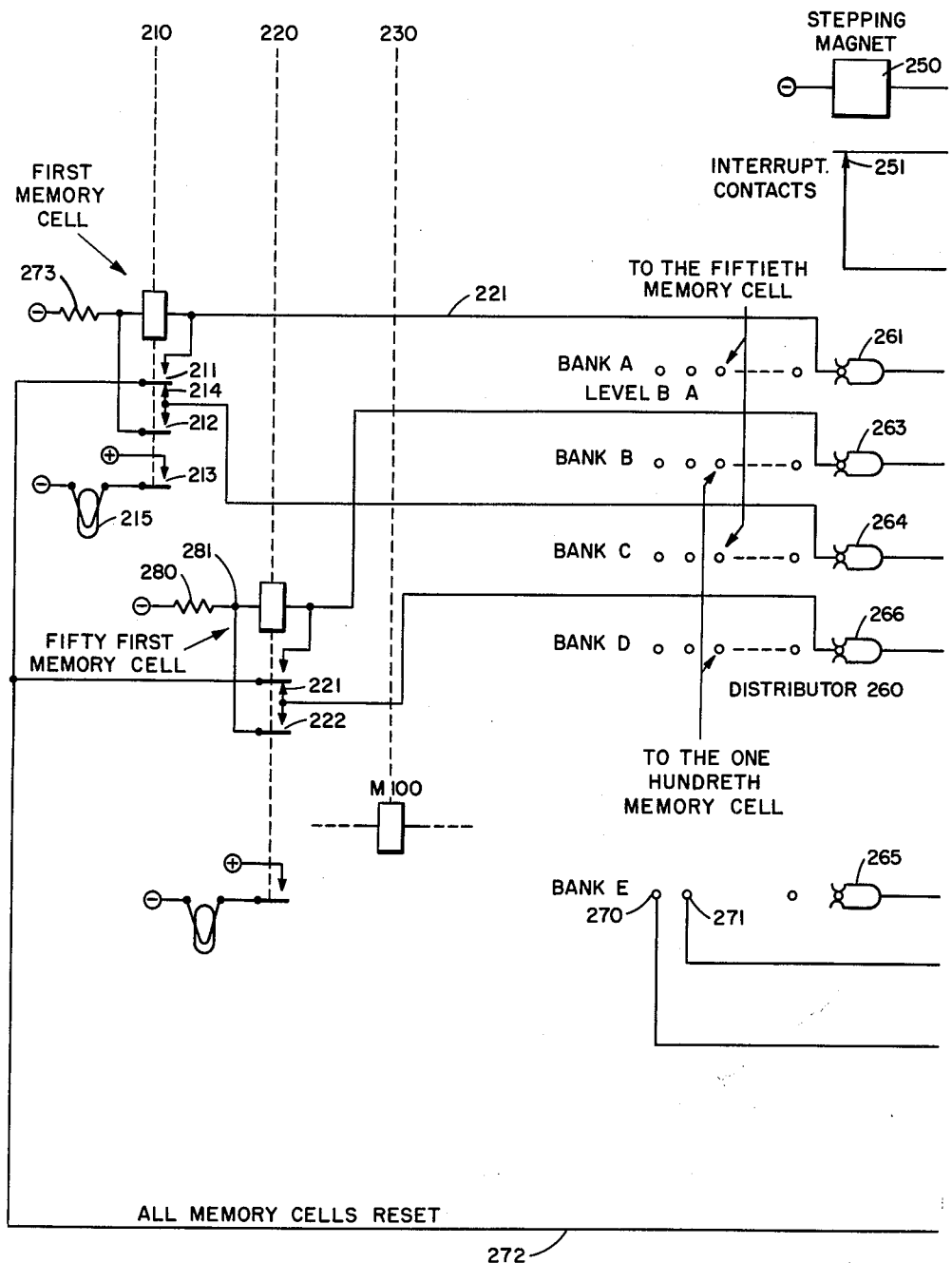
Figure 3:
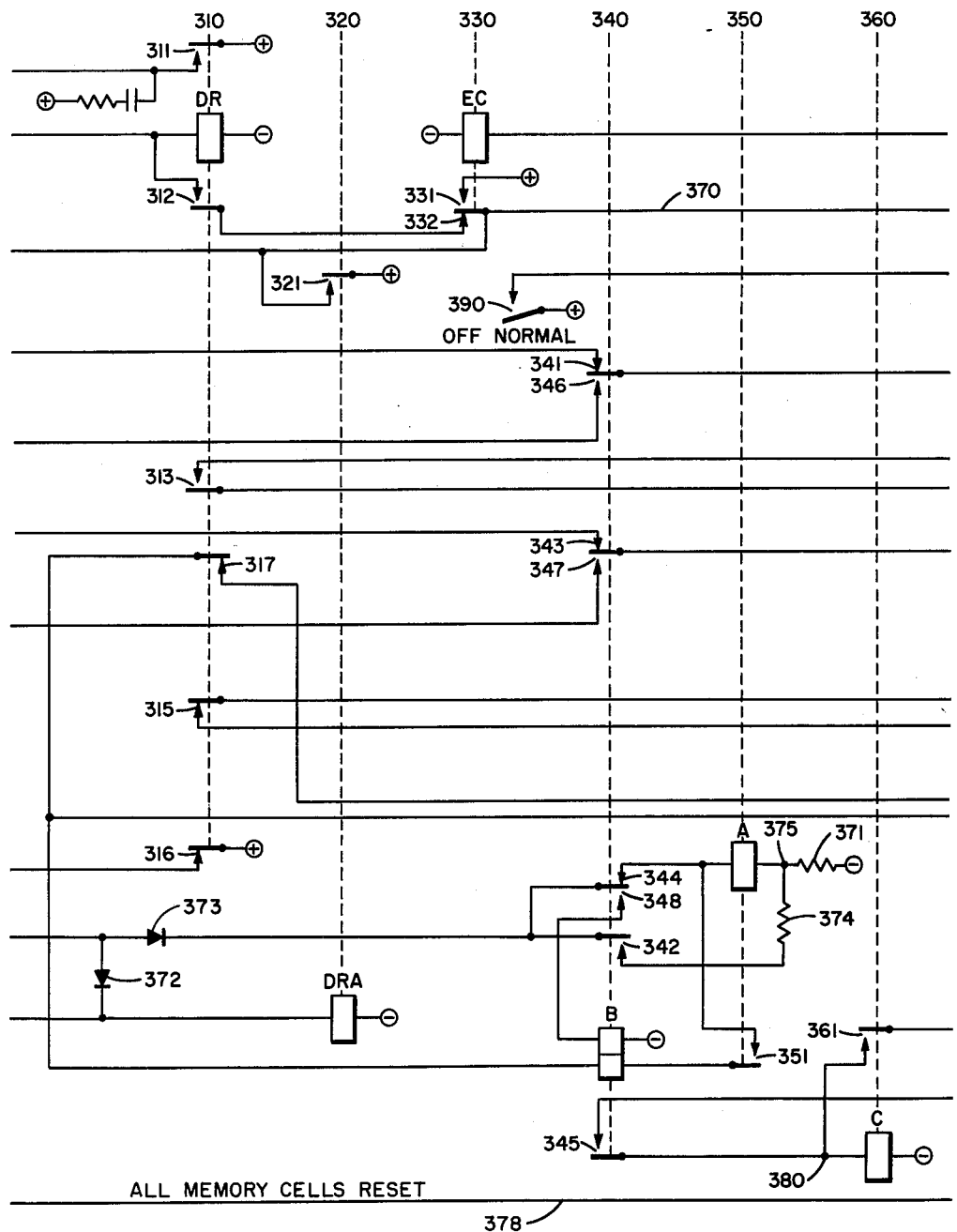

The inspection system will now step through its second cycle but will not cause the reinspection of a sample unless its associated memory relay is in a set or operated condition. The second cycle commences with wipers 261 and 264 in contact with the distributor terminals which are coupled to memory relay 210, as shown in FIG. 2. Assuming that the first sample associated with memory relay 210 gave a satisfactory count on the first cycle and that therefore memory relay 210 is not operated, skip relay 430 becomes immediately energized through the circuit comprising negative terminal 481, the winding of skip relay 430, closed contacts 315, closed contacts 423 of D relay 420, closed contacts 444, closed contacts 343, wiper 264, closed contacts 214, lead 272, lead 378, lead 470, resistor 471 and closed contacts 463. It should be noted that skip relay 430 could not be operated during the first cycle since D relay 420 was unenergized during that period and contacts 423 were open. Before slow-to-operate relay 520 becomes energized through contacts 552, skip relay 430 operates to produce a negative pulse on advance lead 473 thereby to energize relay 570 which puts motor 541 into operation to position the second sample opposite radiation detector 550. As this change is made, contacts 548 are closed by cam 549 to produce a positive pulse on the sample change lead 545, on lead 474, closed contacts 462, lead 370 and closed contacts 251 thereby to cause energization of drive relay 310 which in turn causes the distributor wipers to advance to the next level. It should be noted that this entire action takes less time than it takes to operate slow-to-operate relay 520 and as a result the timer is not triggered into operation and reinspection of the first sample does not take place. This process continues for each step until the wipers of the distributor are positioned in a level whose associated memory relay is in a locked or operated state. Assume that memory relay 220 of the fifty-first memory cell is in this state. The wipers are in the "home" position, as shown in FIG. 2, and relays A and B are again operated as was previously explained. This action causes contacts 346 and 347 to close thereby to enable banks B and D of distributor 260 so that relay 220 of the fifty-first memory cell is coupled to the wipers as shown in FIG. 2. If memory relay 220 is in a state of operation, skip relay 430 will not be energized because contacts 221 are open and hence the circuit for operating skip relay 430, previously described, is broken at this point. Negative potential is applied to both terminals of the skip relay winding and hence it remains unoperated. This negative potential is applied through resistor 280, closed contacts 222, wiper 266, closed contacts 347, closed contacts 444, closed contacts 423 and closed contacts 315. The check relay 440 is unoperated since the timer has not been triggered yet. Since skip relay 430 is unoperated, negative potential is not applied to advance lead 473 and the motor is not energized. Slow-to-operate relay 520 is able to operate in the usual manner thereby triggering timer 560 and initiating the inspection process as in the first cycle. In the event that the fifty-first sample again fails inspection, memory relay 220 remains operated. However, assuming that the sample passes inspection during the inspection interval defined by timer 560, contacts 511 will close as previously explained so that check relay 440 becomes energized at the end of the timing interval. This action causes contacts 443 to close causing current to flow through the circuit comprising the winding of reset relay 410, closed contacts 443, closed contacts 347, wiper 266, closed contacts 222 and resistor 280. The resulting voltage drop across resistor 280 causes junction 281 to become more positive than before so that an insufficient voltage drop exists across the winding of memory relay 220 and accordingly the relay is deenergized. Upon the energization of reset relay 410, contacts 411 close to energize drive relay 310 through a circuit including closed contacts 411, lead 370, closed interrupt contacts 251 and the winding of drive relay 310. The stepping magnet steps as explained previously.

Generally, when all memory cells become reset, the motor will be shut down in the middle of a cycle as previously explained. The operator causes the system to step to the "home" position by releasing start key 460. "Off normal" contacts 390 are closed except when the system is in the "home" position so that end-of-cycle relay 330 becomes energized through a circuit including "off normal" contacts 390, closed contacts 461 and the winding of end-of-cycle relay 330. Contacts 331 close and the stepping magnet is stepped to the "home" position as explained in connection with the closure of contacts 321.

While I have shown and described a specific embodiment of my invention, other modifications will readily occur to those skilled in the art. I do not therefore desire my invention to be limited to the specific arrangement shown and described, and I intend in the appended claims to cover all modifications within the spirit and scope of my invention.

What is claimed is:
1. An automatic tester for inspecting a batch of samples during a first cycle of operation and for reinspecting the batch of samples during subsequent cycles comprising, a plurality of memory devices, each having two stable states and each associated with a corresponding sample to be inspected, means for sequentially inspecting each sample of the batch during the first cycle and for causing each memory device to assume a first state if its associated sample fails inspection and to assume a second state if its associated sample passes inspection, means operative from the beginning of the second cycle for causing said means for sequentially inspecting to skip over any sample whose associated memory device assumes the second state after the first cycle and to inspect only those samples whose associated memory devices assume the first state after the first cycle and means for causing memory devices assuming the first state during the second or subsequent cycle to assume the second state after its associated sample passes inspection.

2. The combination as set forth in claim 1 wherein means coupled to said memory devices are provided for giving an indication after the first cycle when all of said memory devices assume the second state.

3. The combination as set forth in claim 1 wherein means coupled to said memory devices are provided for halting the operation of said means for sequentially inspecting after the first cycle when all of said memory devices assume the second state.

4. An automatic tester for inspecting a batch of radioactive samples during a first cycle of operation and for reinspecting the samples of said batch during subsequent cycles of operation comprising, a plurality of memory devices each having two stable states and each associated with a corresponding sample whose radioactive count is to be measured, means for sequentially measuring the count of each sample of the batch during the first cycle and for causing each memory device to assume a first state if the count of its associated sample falls below a preset figure and for causing each memory device to assume a second state if the count of its associated sample rises above a preset figure, means operative from the beginning of the second cycle for causing said means for sequentially measuring the count of each sample to skip over any sample whose associated memory device assumes the second state after the first cycle and to again measure the count of those samples whose associated memory devices assume the first state after the first cycle and means for causing those memory devices assuming the first state on the second or subsequent cycles to assume the second state if the count of its associated sample becomes greater than the preset count.

5. The combination as set forth in claim 4 wherein means coupled to said memory devices are provided for giving an indication after the first cycle when all of said memory devices assume the second state.

6. The combination as set forth in claim 4 wherein means coupled to said memory devices are provided for halting the operation of said means for sequentially inspecting after the first cycle when all of said memory devices assume the second state.

7. An automatic tester for inspecting a batch of samples during a first interval and for reinspecting the batch of samples during subsequent intervals comprising, a plurality of memory devices, each having two stable states and each associated with a corresponding sample to be inspected, means for inspecting each sample of the batch during the first interval for causing each memory device to assume a first state if its associated sample fails inspection and to assume a second state if its associated sample passes inspection, means operative from the beginning of the second interval for preventing said means for inspecting from inspecting any sample whose associated memory device assumes the second state after the first interval and for allowing said means for inspecting to inspect only those samples whose associated memory devices assume the first state after the first cycle, and means for causing memory devices assuming the first state during the second or subsequent intervals to assume the second state after its associated sample passes inspection.

8. The combination as set forth in claim 7 wherein means coupled to said memory devices are provided for giving an indication after the termination of the first interval when all of said memory devices assume the second state.

9. The combination as set forth in claim 7 wherein means coupled to said memory devices are provided for halting the operation of said means for inspecting after the first interval when all of said memory devices assume the second state.

10. An automatic tester for inspecting a batch of samples comprising, means for sequentially inspecting each of a plurality of samples and for producing one type of output signal for each satisfactory sample and for producing a second type of output signal for each unsatisfactory sample, a bank of memory devices each having two stable states and each associated with a corresponding sample to be inspected, a distributor for transmitting the output signals of said means for sequentially inspecting to said bank of memory devices, means for advancing said distributor in synchronism with the operation of said means for sequentially inspecting so that the state of each memory device of said bank of memory devices indicates whether or not its associated sample is satisfactory or unsatisfactory, and means coupled to said bank of memory devices for producing a signal if each memory device indicates a satisfactory condition of its associated sample.

11. An automatic tester for inspecting a batch of samples comprising, means for sequentially inspecting each of a plurality of samples and for producing one type of output signal for each satisfactory sample and for producing a second type of output signal for each unsatisfactory sample, a bank of memory devices each having two stable states and each associated with a corresponding sample to be inspected, a distributor for transmitting the output signals of said means for sequentially inspecting to said bank of memory devices, means for advancing said distributor in synchronism with the operation of said means for sequentially inspecting so that the state of each memory device of said bank of memory devices indicates whether or not its associated sample is satisfactory or unsatisfactory, and means for maintaining the operation of said means for sequentially inspecting for reinspection purposes until the state of each memory device indicates a satisfactory condition of its associated sample.

References Cited in the file of this patent

UNITED STATES PATENTS

| | | |
|---|---|---|
| 2,217,342 | Ladrach | Oct. 8, 1940 |
| 2,773,596 | Bartlett | Dec. 11, 1956 |
| 2,843,753 | Meeder | July 15, 1958 |
| 2,859,871 | Harlow | Nov. 11, 1958 |
| 2,892,156 | Dawson | June 23, 1959 |
| 2,905,318 | Schell | Sept. 22, 1959 |